United States Patent [19]

Goshima et al.

[11] Patent Number: 4,854,557

[45] Date of Patent: Aug. 8, 1989

[54] AIR SPRINGS

[75] Inventors: Norio Goshima; Isao Watanabe, both of Tokyo, Japan

[73] Assignee: Bridgestone Corporation, Tokyo, Japan

[21] Appl. No.: 173,908

[22] Filed: Mar. 28, 1988

[30] Foreign Application Priority Data

Apr. 3, 1987 [JP] Japan .................................. 62-81289

[51] Int. Cl.⁴ .......................... B60G 11/28; F16F 9/04
[52] U.S. Cl. .................................... 267/64.27; 267/35
[58] Field of Search ..................... 267/35, 64.24, 64.27; 280/711

[56] References Cited

U.S. PATENT DOCUMENTS

| | | | |
|---|---|---|---|
| 3,319,952 | 5/1967 | Travers | 267/64.27 |
| 4,174,827 | 11/1979 | Hirtreiter et al. | 267/64.27 |
| 4,378,935 | 4/1983 | Brown et al. | 267/64.27 |
| 4,688,774 | 8/1987 | Warmuth | 267/64.24 X |
| 4,712,776 | 12/1987 | Geno et al. | 267/64.24 X |

Primary Examiner—Duane A. Reger
Attorney, Agent, or Firm—Sughrue, Mion, Zinn, Macpeak & Seas

[57] ABSTRACT

An air spring comprises a substantially tapered flexible air sleeve, a piston connected to the small-diameter portion of the air sleeve, and an end cap connected to the large-diameter portion of the air sleeve. In this air spring after the inflation, the length of freely deformable portion of the air sleeve is longest at a position in its peripheral direction and shortest at a position opposite to the longest position in radial direction and is gradually changed between the longest position and the shortest position.

6 Claims, 6 Drawing Sheets

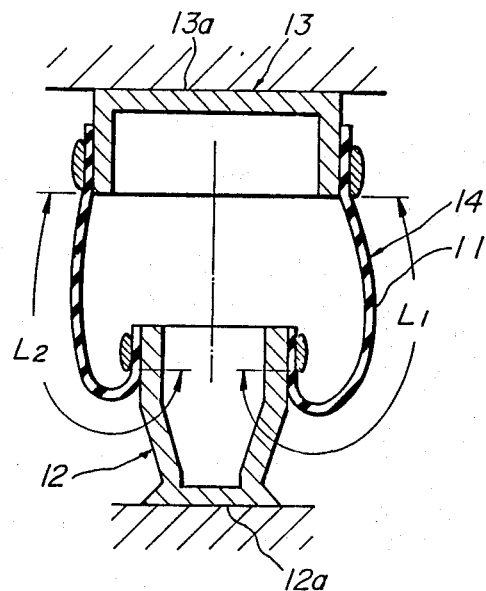
FIG_1
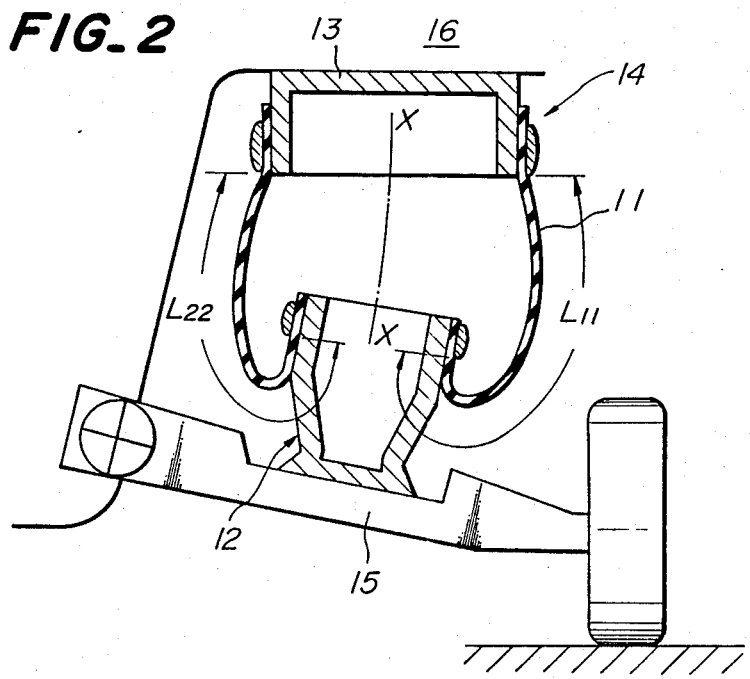
FIG_2

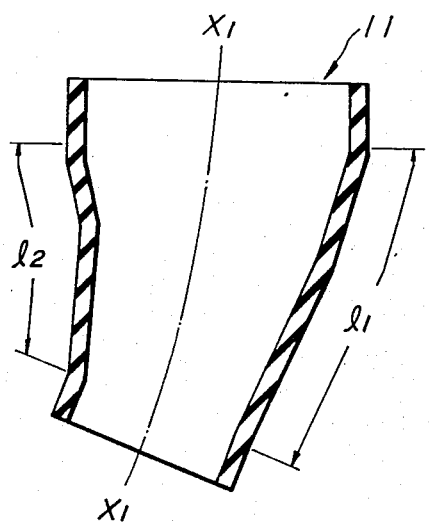
FIG._3a
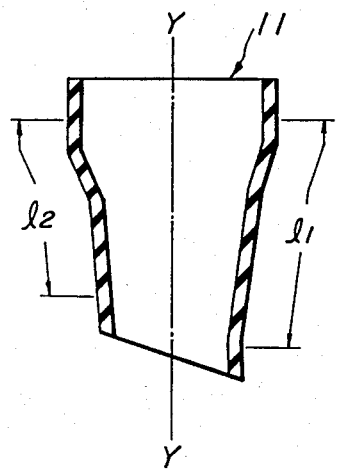
FIG._3b
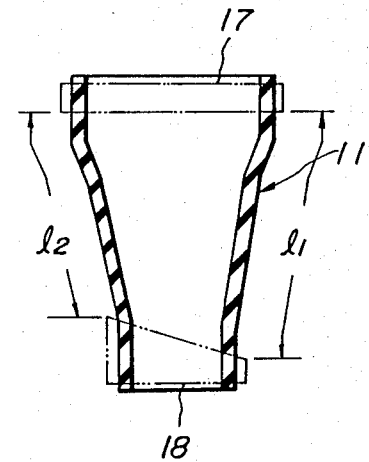
FIG._3c

FIG_4a
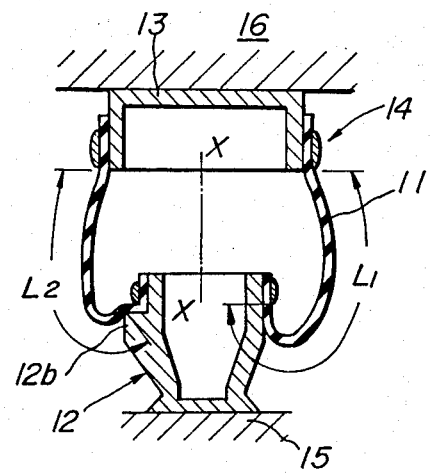
FIG_4b
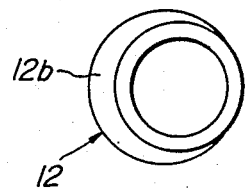
FIG_4c
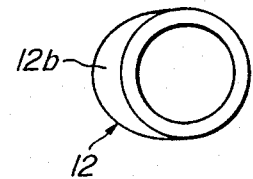

FIG_5
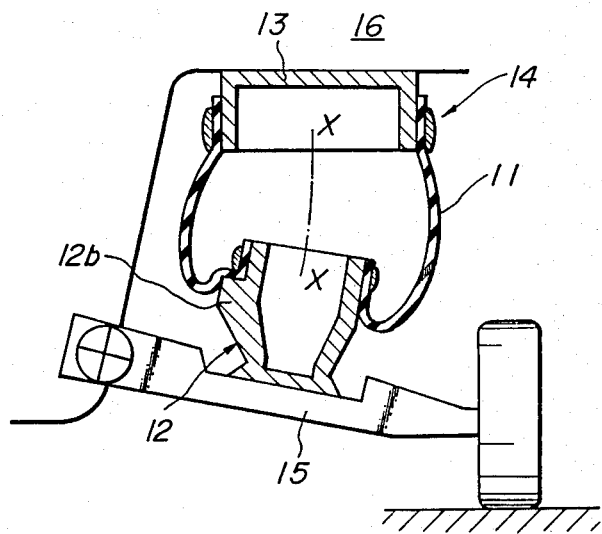

FIG_6a
PRIOR ART
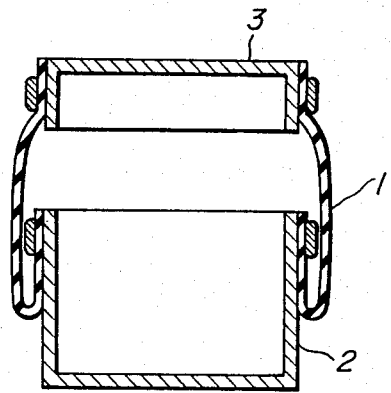
FIG_6b
PRIOR ART
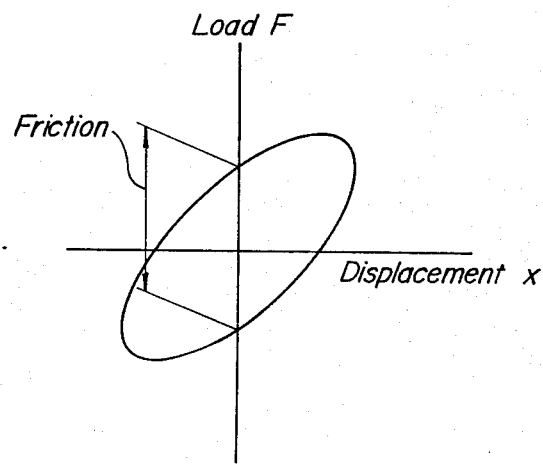

FIG_7
PRIOR ART
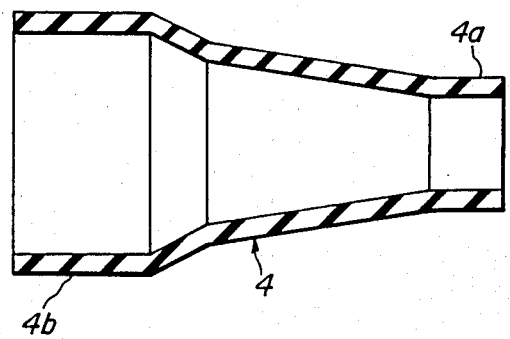
FIG_8
PRIOR ART
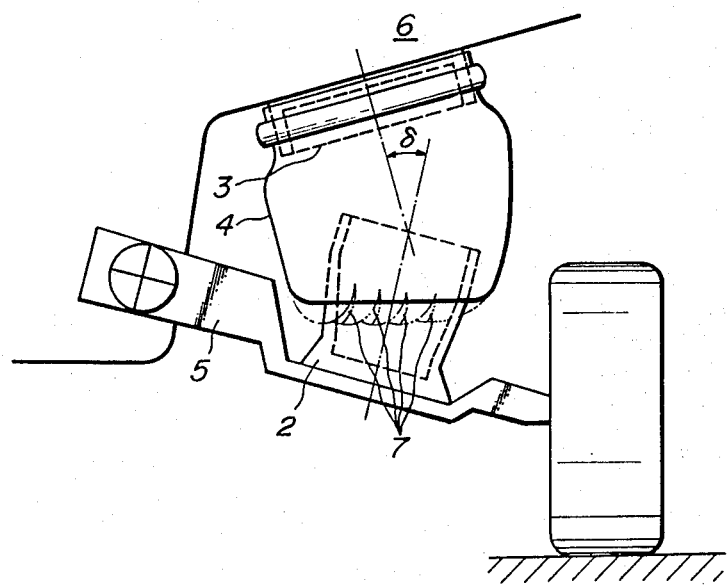

AIR SPRINGS

BACKGROUND OF THE INVENTION

1. Field of the Invention

This invention relates to an air spring using a substantially tapered flexible air sleeve. More particularly it relates to an air spring capable of sufficiently reducing friction and effectively preventing the occurrence of wrinkles in a turned-up portion of the air sleeve when it is applied to a structure of changing a deflection angle between axis of piston and axis of end cap in expansion and contraction operation.

2. Related Art Statement

As the conventionally known diaphragm type air spring, there is a structure that a straight-type air sleeve 1 having uniform inner and outer diameters over its whole length is airtightly connected at its end portions to a piston 2 and an end cap 3, respectively, as shown in FIG. 6a.

In the air spring using such a straight-type air sleeve 1, however, the distance of elastic hysteresis loop in a direction of minor axis becomes fairly long as shown in a load-displacement curve of FIG. 6b and hence the distance between intersections of hysteresis loop and load axis or friction is large. For instance, when this air spring is applied to an automotive vehicle, if vibrations having an amplitude of about ±10 mm are transmitted thereto, these vibrations can not effectively be absorbed by the air spring, so that the ride comfortability on the vehicle is considerably damaged.

Recently, in order to sufficiently reduce the friction in the air spring and ensure the large relative stroke of the piston 2 to the end cap 3, there has been proposed an air spring that an air sleeve 4 having a substantially tapered from as sectionally shown in FIG. 7 is airtightly connected at its small-diameter end portion 4a to the piston 2 and at its large-diameter end portion 4b to the end cap 3. Also, the gauge of the air sleeve 4 in uniformly thinned to, for example, about 2 mm for more reducing the friction.

For instance, when the above air spring is mounted to an automotive vehicle at a posture shown in FIG. 6a, or when the air spring is used to align the axis of the piston 2 and the axis of the end cap 3 on a common line, friction is reduced to improve the ride comfortability on the vehicle and also vibrations having a small amplitude as well as vibrations having a large amplitude are sufficiently absorbed.

In these conventional air springs, however, when the air spring is applied to cross the axis of the piston 2 and the axis of the end cap 3 with each other at a deflection angle δ under a service load by fixing the piston 2 and the end cap 3 to an unsprung member 5 and a sprung member 6 in a vehicle. The unsprung member 5 and the sprung member 6 gradually extend toward the side direction of the vehicle as shown in FIG. 8. There is still a problem that when the air spring is deformed in a direction of increasing the deflection angle or in the expansion direction under a load larger than the service load, many wrinkles 7 are always produced in a turned-up portion of the air sleeve 4 as shown by a phantom line to lower the durability of the air sleeve 4.

SUMMARY OF THE INVENTION

It is, therefore, an object of the invention to advantageously solve the aforementioned problems of the conventional techniques and to provide an air spring capable of sufficiently reducing the friction under a service stroke of the air spring and producing no wrinkles in the air sleeve even at the increase of deflection angle between the axis of the piston and the axis of the end cap.

According to the invention, there is the provision of an air spring comprising a flexible air sleeve of a substantially tapered form as a whole, a piston airtightly connected to the small-diameter end portion of the air sleeve at its inwardly turned-up state and an end cap airtightly connected to the large-diameter end portion of the air sleeve, characterized in that the axial lines of the piston and the end cap connected to the air sleeve are aligned with each other, and a length of a freely deformable portion in the air sleeve at an internal pressure filled posture, for example, a length of connected portion of the air sleeve extending between the piston and the end cap is longest at a position in the peripheral direction of the air sleeve and shortest at a position opposite to the longest position in the radial direction and gradually changes between the longest position and the shortest position.

Moreover, the difference in the length of the freely deformable portion of the air sleeve can properly be selected in accordance with the deflection angle between the axis of the piston and the axis of the end cap at the application state of the air spring or at the operation state of the air spring under a service stroke.

In the air spring according to the invention, when the air sleeve is curved in any direction, the position showing the longest length of the freely deformable portion of the air sleeve locates outside the curve, while the position showing the shortest length of the freely deformable portion locates inside the curve, so that the air sleeve is subjected to an approximately uniform external tension force in the lengthwise direction based on the internal pressure filled in the air spring even at any positions in the peripheral direction at the applied state of the air spring or use state under the service stroke. This is also true when the air spring is deformed in a direction of increasing the deflection angle between the axis of the piston and the axis of the end cap. Even in the latter case, there no fear of generating cramp, wrinkle or the like in the turned-up portion of the air sleeve due to the fact that external tension force acting to the turned-up portion is non-uniform the peripheral direction and consequently the durability of the air sleeve is considerably enhanced.

Furthermore, the air sleeve is shaped into a substantially tapered form as a whole and preferably, the gauge thereof is sufficiently thinned, whereby the friction under the service stroke of the air spring can sufficiently be reduced to effectively improve the ride comfortability on the vehicle.

BRIEF DESCRIPTION OF THE DRAWINGS

The invention will be described with reference to the accompanying drawings, wherein:

FIG. 1 is a sectional view of an embodiment of the air spring according to the invention;

FIG. 2 is a schematic view illustrating the application of the air spring shown in FIG. 1 to an automotive vehicle;

FIGS. 3a to 3c are axially sectional views of various embodiments of the air sleeve applicable to the air spring of FIG. 1, respectively;

FIG. 4a is a sectional view of another embodiment of the air spring according to the invention;

FIGS. 4b and 4c are plan views of embodiments of the piston used in the air spring of FIG. 4a;

FIG. 5 is a schematic view illustrating the application of the air spring of FIG. 4a to an automotive vehicle;

FIG. 6a is a sectional view of the conventional air spring;

FIG. 6b is a diagram showing a hysteresis loop of the air spring of FIG. 6a;

FIG. 7 is an axially sectional view of the conventional tapered air sleeve; and

FIG. 8 is a schematic view illustrating the application of the conventional air spring to an automotive vehicle.

DESCRIPTION OF THE PREFERRED EMBODIMENTS

In FIG. 1 is sectionally shown a first embodiment of the air spring according to the invention, wherein numeral 11 is a flexible air sleeve having a substantially tapered form as a whole. The air sleeve 11 is airtightly connected at its small-diameter end portion to a piston 12 under an inwardly turned state on one hand, and at its large-diameter end portion to an filled in the inside of the air sleeve 11 under a proper pressure to form an air spring 14.

In the illustrated air spring 14, the length of freely deformable portion of the air sleeve 11 at the connected state of the air sleeve to the piston 12 and the end cap 13, i.e. the connecting length of the air sleeve extending between the piston 12 and the end cap 13 is made longest at a position in the peripheral direction thereof and shortest at a position opposite to the longest position in the radial direction and is gradually changed between the longest position and the shortest position. Thus, the bottom face 12a of the piston 12 is maintained in parallel with the top face 13a of the end cap 13 to align the axes of the piston and end cap with each other. At a posture when the air spring is inflated under an internal pressure as shown in FIG. 1, the length of the longest position of the freely deformable portion in the air sleeve 11 is $L_1$ proportional to the original length and the length of the shortest position is $L_2$ proportional to the original length, and the length between both the positions is gradually changed from one of the positions to the other.

When the piston 12 and the end cap 13 in the air spring 14 are fixed to an unsprung member 15 and a sprung member 16 in a vehicle wherein the unsprung member 15 and the sprung member 16 are gradually enlarged in the side direction as shown in FIG. 2, respectively, if oscillation motion is caused in a vertical plane of the unsprung member 15, the piston 12 enables to move on a curved axial line X—X of the air sleeve 11. In such an application state of the air spring 14, the lengths of the air sleeve 11 connected to the piston 12 and the end cap 13 are frequently $L_{11}$ longer than the length $L_1$ at the outside of the curve and $L_{22}$ shorter than the length $L_2$ at the inside of the curve as compared with the case of FIG. 1.

In this case, the difference between the lengths $L_1$ and $L_2$ of the freely deformable portion of the air sleeve 11 as shown in FIG. 1 can properly be selected in accordance with the degree of the curve at the mounted state of the air spring 14 as shown in FIG. 2. Therefore, when the lengths $L_1$ and $L_2$ are sufficiently and properly selected, the air spring 14 can be mounted onto the vehicle without hardly changing these lengths.

In FIGS. 3a to 3c are shown various embodiments of the air sleeve 11 applicable for use in the air spring 14.

The air sleeve 11 of FIG. 3a has a substantially tapered form as a whole and is previously curved in a predetermined form, whose axial line $X_1$—$X_1$ preferably matches with the curved axial line X—X of the air sleeve 11 at the mounted state of the air spring 14. Furthermore, in the air sleeve 11 extending from the small-diameter end portion connected to the piston 12 to the large-diameter end portion connected to the end cap 13, the longest length $l_1$ is outside the curve and the shortest length $l_2$ is inside the curve.

FIG. 3b shows another embodiment of the air sleeve 11, which has a substantially tapered form as a whole likewise the case of FIG. 3a, but the center axis Y—Y thereof is straight and the elongated line of the small-diameter end portion slantly intersects with the center axis Y—Y.

Even in the air sleeve 11 of FIG. 3b, the longest length of the portion connecting to the piston 12 and end cap 13 is made $l_1$ and the shortest length thereof is made $l_2$, whereby the freely deformable lengths $L_1$ and $L_2$ as shown in FIG. 1 can be obtained when the air sleeve 11 is connected to the piston 12 and the end cap 13 and then inflated under a given internal pressure. Furthermore, when such an air spring is applied to the vehicle as shown in FIG. 2, the lengths inside and outside the curve are substantially the same as in FIG. 2 at a curved state of the central axis of the air spring itself and hence the central axis of the air sleeve 11.

FIG. 3c shows the other embodiment of the air sleeve, which is substantially the same as the air sleeve 4 of FIG. 7 and produces an air spring similar to the case of using the air sleeve 11 of FIG. 3b by using particular clamping members.

That is, the large-diameter end portion of the air sleeve 11 is fixed to the end cap 13 through a belt 17 having an equal width over a whole periphery as shown by a phantom line in FIG. 3c, while the small-diameter end portion thereof is fixed to the piston 12 through a belt 18 having a gradually changed width in circumferential direction, whereby the length of the air sleeve 11 connecting to the piston 12 and the end cap 13 is $l_1$ at the longest position and $l_2$ at the shortest position and the central axis thereof is substantially curved likewise the case of FIG. 2, whereby the lengths inside and outside the curve are the same as in FIG. 2.

According to the air spring 14 of the above structure, since the flexible air sleeve 11 is shaped into a substantially tapered form as a whole, when vibrations are transmitted to this air spring, the friction can be reduced to sufficiently improve the ride comfortability on the vehicle irrespective of large and small amplitudes of vibrations.

Furthermore, the lengths of the air sleeve 11 connected to the piston 12 and the end cap 13 are longest ($L_1$) at a position in the peripheral direction and shortest ($L_2$) at a position opposite to the longest position in radial direction in the posture of air spring shown in FIG. 1, and are gradually changed between the longest position and the shortest position. Thus the tensile stress acting to the air sleeve 11 in the longitudinal direction can substantially be uniformized over a whole in circumferential direction at the application state of the air spring 14 as shown in FIG. 2 and under a service stroke thereof. Therefore, even if the thickness of the air sleeve 11 is very thin, the occurrence of cramp, wrinkle or the like in the turned-up portion of the air sleeve can completely be prevented at the above state. Furthermore, even when the air spring 14 is deformed in a direction of increasing the deflection angle between the axis of the piston and the axis of the end cap, the tensile stress acting to the turned-up portion of the air sleeve 11 can sufficiently be uniformized in circumferential direction to effectively prevent the occurrence of cramp and wrinkle.

In FIG. 4 sectionally illustrates another embodiment of the air spring according to the invention, which produces the function and effect similar to the aforementioned embodiment by using the same air sleeve 11 as in FIG. 7 and a special piston 12 for this air sleeve 11.

In the embodiment of FIG. 4, a belt-like protrusion 12b projecting outward in radial direction is arranged in the portion of the piston 12 connecting to the air sleeve 11 as shown in FIG. 4b. The projecting amount of the belt-like protrusion 12b in radial direction is made minimum at a position of the piston 12 in the peripheral direction and maximum at a position opposite to the minimum position in radial direction. Thus, the freely deformable portion in the air sleeve 11 has a longest length $L_1$ at the minimum projecting position of the protrusion 12b and a shortest length $L_2$ at the maximum projecting position. That is, in this embodiment, the portion of the air sleeve riding on the shoulder part of the protrusion 12b can not substantially deform except for a special case that the piston 12 and the end cap 13 are extremely separated from each other so as not to cause the slackening of the air sleeve 11. Hence, even when the air sleeve itself is symmetrical with respect to the axial line as shown in FIG. 7, if the air spring is inflated under a given internal pressure as shown in FIG. 4a, the length of the freely deformable portion of the air sleeve becomes shorter by a length corresponding to the length of the air sleeve located on the shoulder part of the belt-like protrusion 12b at the outwardly projecting position of the piston 12 as compared with the length at the non-projecting position of the piston. Therefore, when this air spring 14 is applied so that the maximum projecting position of the belt-like protrusion 12b locates inside the curve of the air sleeve 11 and the minimum projecting position locates outside thereof as shown in FIG. 5, the tensile stress acting to the turned-up portion of the air sleeve 11 can sufficiently be uniformized in the circumferential direction likewise the aforementioned case and consequently the occurrence of cramp, wrinkle and the like can effectively be prevented.

Moreover, the amount of the belt-like protrusion 12b projecting outward from the piston in radial direction may be changed into an ellipsoidal form in the circumferential direction in accordance with the use conditions and the like as shown in FIG. 4c.

Although the invention has been described with respect to the illustrated embodiments, it is a matter of course that the air spring according to the invention may be applied to a case of increasing the deflection angle between the axis of the piston and the axis of the end cap when the piston and the end cap displace in a direction of approaching to each other.

As mentioned above, according to the invention, the axial lines of the piston and the end cap connected to the air sleeve are aligned to each other, while the length of the freely deformable portion of the air sleeve at the posture inflated under internal pressure is longest at a position in the peripheral direction and shortest at a position opposite to the longest position in radial direction and is gradually changed between the longest position and the shortest position. Thus even when the air spring is deformed in a direction of increasing the deflection angle between the axis of the piston and the axis of the end cap, or even if the gauge of the air sleeve is thin, the occurrence of cramp, wrinkle and the like in the turned-up portion of the air sleeve can effectively be prevented and the durability of the air sleeve can considerably be improved.

Furthermore, the air sleeve is shaped into a substantially tapered form as a whole, whereby the friction of the air spring can be reduced to sufficiently absorb vibrations.

What is claimed is:

1. Apparatus defining an air spring comprising; a flexible air sleeve of a substantially tapered form as a whole, a piston airtightly connected to a small-diameter end portion of the air sleeve at its inwardly turned-up state and an end cap airtightly connected to a large-diameter end portion of the air sleeve, said air sleeve having a freely deformable portion defined as a length between connected portions of the air sleeve to the piston and the end cap and is longest at a position in the peripheral direction of the air sleeve, shortest at a position opposite to the longest position in the radial direction and gradually changes between the longest position and the shortest position when an axis of the piston and an axis of the end cap are aligned in a straight line with each other and the air sleeve is filled with an internal pressure, and wherein the air spring is mounted so that the axis of the piston and the axis of the end cap cross with each other at a deflection angle under a service load and the piston and the end cap to move on a curved axial line of the air sleeve.

2. The apparatus of claim 1 wherein said air sleeve comprises an asymmetrical tapered sleeve, said sleeve having a preferred curvature.

3. The apparatus of claim 1 wherein said small-diameter end portion is slanted at an obtuse angle to a center axis of said sleeve.

4. The apparatus of claim 1 further comprising a first belt coupling said large-diameter end to said end cap and a second belt coupling said small-diameter end to said piston, said second belt having a width that changes circumferentially.

5. The apparatus of claim 1 wherein said piston comprises a shoulder portion to prevent deformation of said shortest length said air sleeve.

6. The apparatus of claim 5 wherein said shoulder is an ellipsoid around said piston.

* * * * *